(12) United States Patent
Talukdar et al.

(10) Patent No.: US 9,648,616 B2
(45) Date of Patent: May 9, 2017

(54) METHOD AND APPARATUS FOR IMPLEMENTING EFFICIENT LOW-LATENCY UPLINK ACCESS

(71) Applicant: NOKIA SOLUTIONS AND NETWORKS OY, Espoo (FI)

(72) Inventors: Anup Talukdar, Schaumburg, IL (US); Mark Cudak, Rolling Meadows, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 101 days.

(21) Appl. No.: 14/597,994

(22) Filed: Jan. 15, 2015

(65) Prior Publication Data
US 2016/0212741 A1    Jul. 21, 2016

(51) Int. Cl.
*H04W 74/08*    (2009.01)
*H04W 72/04*    (2009.01)
*H04W 84/18*    (2009.01)

(52) U.S. Cl.
CPC ..... *H04W 72/0446* (2013.01); *H04W 72/042* (2013.01); *H04W 74/0833* (2013.01); *H04W 74/0866* (2013.01); *H04W 84/18* (2013.01)

(58) Field of Classification Search
CPC . H04W 16/28; H04W 28/26; H04W 52/0216; H04W 72/00; H04W 72/042; H04W 72/0413; H04W 72/0446; H04W 74/006; H04W 74/04; H04W 74/042; H04W 74/0891; H04W 88/08; H04W 28/18; H04W 72/0426; H04W 72/12; H04W 74/00; H04W 74/08; H04W 74/0816; H04W 74/0833; H04W 84/12; H04L 1/00; H04L 5/0053; H04L 12/66;
(Continued)

(56) References Cited

U.S. PATENT DOCUMENTS 5,594,738 A * 1/1997 Crisler .............. H04J 3/1694
370/347
6,038,455 A * 3/2000 Gardner ............ H04B 7/2615
370/337
(Continued)

FOREIGN PATENT DOCUMENTS

WO    2014/009246 A1    1/2014
WO    2014/009250 A1    1/2014

OTHER PUBLICATIONS

Levanen et al., Radio Interface Design for Ultra-Low Latency Milimeter Wave Communications in 5G Era, Globecom 2014 Workshop—Ultra-Low Latency and Ultra-High Reliability in Wireless Communications, Dec. 2014, p. 1420-1426.*
(Continued)

*Primary Examiner* — Michael Thier
*Assistant Examiner* — Eric Nowlin
(74) *Attorney, Agent, or Firm* — Squire Patton Boggs (US) LLP

(57) ABSTRACT

A method and apparatus may determine a plurality of access points. The plurality of access points belong to a cluster set of a user device. The method may also include allocating a plurality of random-access-channel slots to the plurality of access points such that the plurality of random-access-channel slots are staggered in time over a random-access-channel period within a frame structure used by the user device.

28 Claims, 15 Drawing Sheets

(58) Field of Classification Search
CPC ... H04B 7/0617; H04B 7/2643; H04B 7/2656
See application file for complete search history.

(56) References Cited

U.S. PATENT DOCUMENTS

| | | | |
|---|---|---|---|
| 6,982,968 B1 | 1/2006 | Barratt et al. | |
| 7,433,336 B1 | 10/2008 | Hobza | |
| 7,616,556 B2* | 11/2009 | Nystrom | H04L 27/30 370/208 |
| 7,873,036 B2 | 1/2011 | Sreemanthula et al. | |
| 8,286,217 B2* | 10/2012 | Horen | H04N 21/26275 725/118 |
| 8,320,312 B2* | 11/2012 | Olsson | H04W 72/14 370/329 |
| 8,396,082 B2* | 3/2013 | Hannuksela | H04L 1/0057 370/473 |
| 8,494,164 B2 | 7/2013 | Kweon et al. | |
| 8,559,393 B2 | 10/2013 | Brandt et al. | |
| 8,717,985 B2* | 5/2014 | Du | H04W 74/006 370/329 |
| 8,879,497 B2 | 11/2014 | Oizumi et al. | |
| 8,913,550 B2 | 12/2014 | Cordeiro et al. | |
| 8,971,247 B2 | 3/2015 | Abraham et al. | |
| 9,191,837 B2 | 11/2015 | Roy et al. | |
| 9,320,023 B2 | 4/2016 | Nory et al. | |
| 2002/0093929 A1* | 7/2002 | Mangold | H04W 36/16 370/336 |
| 2003/0066692 A1* | 4/2003 | Devige | G06F 3/0433 178/18.04 |
| 2004/0148187 A1* | 7/2004 | Boettcher | G06Q 10/06 700/121 |
| 2004/0176024 A1 | 9/2004 | Hsu et al. | |
| 2004/0218577 A1* | 11/2004 | Nguyen | H04B 7/2656 370/347 |
| 2005/0089002 A1* | 4/2005 | Shin | H04W 28/18 370/338 |
| 2005/0190701 A1* | 9/2005 | Bejerano | H04W 28/16 370/252 |
| 2005/0285803 A1* | 12/2005 | Iacono | H04W 16/24 343/702 |
| 2007/0019591 A1* | 1/2007 | Chou | H04W 28/10 370/337 |
| 2007/0060127 A1 | 3/2007 | Forsberg | |
| 2007/0064665 A1* | 3/2007 | Zhang | H04W 72/1226 370/343 |
| 2007/0168841 A1* | 7/2007 | Lakkis | H03M 13/1505 714/781 |
| 2007/0189247 A1 | 8/2007 | Wang et al. | |
| 2008/0072047 A1 | 3/2008 | Sarikaya et al. | |
| 2008/0101308 A1* | 5/2008 | Gaur | H04W 74/0816 370/338 |
| 2008/0137605 A1 | 6/2008 | Berg | |
| 2008/0192707 A1 | 8/2008 | Xhafa et al. | |
| 2008/0198815 A1* | 8/2008 | Liu | H04W 74/0816 370/336 |
| 2009/0088182 A1 | 4/2009 | Piersol et al. | |
| 2009/0094680 A1* | 4/2009 | Gupta | H04L 63/104 726/3 |
| 2009/0122782 A1* | 5/2009 | Horn | H04W 56/001 370/350 |
| 2009/0225682 A1* | 9/2009 | Grote-Lopez | H04L 41/083 370/255 |
| 2009/0232105 A1* | 9/2009 | Kesselman | H01Q 3/26 370/336 |
| 2009/0232106 A1 | 9/2009 | Cordeiro et al. | |
| 2009/0316629 A1 | 12/2009 | Singh et al. | |
| 2010/0034177 A1* | 2/2010 | Santhanam | H04W 74/0883 370/338 |
| 2010/0037123 A1* | 2/2010 | Cookman | H04B 1/1027 714/779 |
| 2010/0069064 A1 | 3/2010 | Hannu et al. | |
| 2010/0093351 A1 | 4/2010 | Barrett et al. | |
| 2010/0103883 A1* | 4/2010 | Das | H04L 12/5695 370/329 |
| 2010/0103913 A1* | 4/2010 | Sung | H04W 74/006 370/338 |
| 2010/0128739 A1* | 5/2010 | Jung | H04L 12/2801 370/458 |
| 2010/0135167 A1* | 6/2010 | Ma | H04W 74/085 370/252 |
| 2010/0135319 A1* | 6/2010 | Wang | H04W 74/0875 370/445 |
| 2010/0157865 A1* | 6/2010 | Iyer | H04W 52/0216 370/311 |
| 2010/0296401 A1* | 11/2010 | Karaoguz | H04L 41/0806 370/252 |
| 2011/0038356 A1* | 2/2011 | Bachrach | H04W 72/1231 370/337 |
| 2011/0058504 A1* | 3/2011 | Jo | H04W 72/1263 370/280 |
| 2011/0075636 A1* | 3/2011 | Blomgren | H04L 1/1822 370/336 |
| 2011/0126271 A1 | 5/2011 | Kim et al. | |
| 2011/0149885 A1* | 6/2011 | Bachu | H04W 74/008 370/329 |
| 2011/0188414 A1* | 8/2011 | Dai | H04B 7/2656 370/280 |
| 2011/0319084 A1 | 12/2011 | Meshkati et al. | |
| 2012/0106522 A1* | 5/2012 | Reumerman | H04W 48/08 370/337 |
| 2012/0115552 A1* | 5/2012 | Bhattacharya | H04W 52/0261 455/574 |
| 2012/0127970 A1* | 5/2012 | Gupta | H04W 16/12 370/336 |
| 2012/0202490 A1* | 8/2012 | Szufarska | H04W 24/10 455/434 |
| 2012/0320881 A1* | 12/2012 | Hong | H04B 7/2646 370/336 |
| 2013/0155847 A1 | 6/2013 | Li et al. | |
| 2013/0182652 A1 | 7/2013 | Tong et al. | |
| 2013/0258862 A1* | 10/2013 | Dinan | H04W 56/00 370/241 |
| 2013/0293412 A1 | 11/2013 | Appleford et al. | |
| 2013/0316730 A1 | 11/2013 | Ding | |
| 2013/0329623 A1 | 12/2013 | Koskela et al. | |
| 2014/0044088 A1 | 2/2014 | Nogami et al. | |
| 2014/0112169 A1 | 4/2014 | Zhou et al. | |
| 2014/0153415 A1 | 6/2014 | Choudhury et al. | |
| 2014/0198723 A1 | 7/2014 | Gong et al. | |
| 2014/0220994 A1* | 8/2014 | Calvanese Strinati | H04W 72/0486 455/452.1 |
| 2014/0269654 A1 | 9/2014 | Canpolat et al. | |
| 2014/0286321 A1 | 9/2014 | Balian et al. | |
| 2014/0301295 A1* | 10/2014 | Abraham | H04W 28/044 370/329 |
| 2014/0328254 A1 | 11/2014 | Lim | |
| 2015/0040195 A1 | 2/2015 | Park et al. | |
| 2015/0049623 A1 | 2/2015 | Yuk et al. | |
| 2015/0124774 A1 | 5/2015 | Kaushik et al. | |
| 2015/0172988 A1 | 6/2015 | Lai et al. | |
| 2015/0189561 A1 | 7/2015 | Dayanandan et al. | |
| 2015/0244486 A1 | 8/2015 | Liang et al. | |
| 2015/0264718 A1* | 9/2015 | Yu | H04W 72/02 370/329 |
| 2015/0289147 A1 | 10/2015 | Lou et al. | |
| 2016/0044733 A1 | 2/2016 | Soriaga et al. | |
| 2016/0154722 A1 | 6/2016 | Petrick et al. | |
| 2016/0157225 A1* | 6/2016 | Joshi | H04W 72/0446 370/329 |
| 2016/0191132 A1 | 6/2016 | Rajagopal et al. | |
| 2016/0212685 A1 | 7/2016 | Talukdar et al. | |
| 2016/0212741 A1 | 7/2016 | Talukdar et al. | |
| 2016/0212765 A1 | 7/2016 | Talukdar et al. | |
| 2016/0330768 A1* | 11/2016 | Hu | H04W 74/006 |

OTHER PUBLICATIONS

U.S. Office Action U.S. Appl. No. 14/597,970 issued on Jul. 12, 2016.

(56) References Cited

OTHER PUBLICATIONS

Cudak et al., "Moving Towards MMWave-Based Beyond-4G (B-4G) Technology", in Proc. IEEE VTC Spring 2013, Jun. 2-5, 2013, pp. 1-5.
Talukdar et al., "Handoff Rates for Millimeterwave 5G Systems", in Proc. IEEE VTC-Spring 2014, May 18-21, 2014, pp. 1-5.
Cudak et al., "Experimental MMWave 5G Cellular System", Dec. 8, 2014, pp. 1-5.
U.S. Patent and Trademark Office, Office Action for co-pending U.S. Appl. No. 14/598,003, dated Dec. 30, 2016.
Mohammad Naghibi and Majid Ghaderi; "Characterizing the Performance of Beamforming WiFi Access Joints", 39th Annual IEEE Conference on Local Computer Networks, IEEE, 2014, pp. 434-437.
U.S. Patent and Trademark Office, Office Action for corresponding U.S. Appl. No. 14/597,987, Aug. 5, 2016.

* cited by examiner

Table 1 Uplink data arrival at queue and RACH usage

| Data arrival in uplink queue | Access Point and RACH slot to be used by the UD |
|---|---|
| During subframe 1-10 | $AP_1$ in subframe 11 |
| During subframe 11-20 | $AP_2$ in subframe 21 |
| During subframe 21-30 | $AP_3$ in subframe 31 |
| During subframe 31-40 | $AP_0$ in subframe 1 |

Fig. 5

METHOD AND APPARATUS FOR IMPLEMENTING EFFICIENT LOW-LATENCY UPLINK ACCESS

BACKGROUND

Field

Embodiments of the invention relate to implementing efficient low-latency uplink access.

Description of the Related Art

5th Generation mobile networks is a standard for wireless communication that seeks to provide improved speed and capacity for wireless communications by using new modulation/signal processing techniques. The standard may be the next major phase of mobile communication beyond the current standards.

SUMMARY

According to a first embodiment, a method may include determining, by a network element, a plurality of access points. The plurality of access points belong to a cluster set of a user device. The method may include allocating a plurality of random-access-channel slots to the plurality of access points such that the plurality of random-access-channel slots are staggered in time over a random-access-channel period within a frame structure used by the user device.

In the method of the first embodiment, the frame structure comprises a 5G mmWave frame structure.

In the method of the first embodiment, the random-access-channel slots are configured for 5G synchronization of both timing and accessibility information.

In the method of the first embodiment, the allocating the plurality of random-access-channel slots to be staggered in time comprises allocating the random-access-channel slots to correspond to different times.

In the method of the first embodiment, the determining comprises determining by a random-access-channel slot configurator.

In the method of the first embodiment, the allocating the plurality of random-access-channel slots comprises independently allocating the random-access-channel slots in the cluster set.

In the method of the first embodiment, the allocating the plurality of random-access-channel slots comprises allocating by network-wide planning.

In the method of the first embodiment, the allocating the plurality of random-access-channel slots comprises allocating the random-access-channel slots to be equally spaced in time.

According to a second embodiment, an apparatus may include at least one processor. The apparatus may also include at least one memory including computer program code. The at least one memory and the computer program code may be configured, with the at least one processor, to cause the apparatus at least to determine a plurality of access points. The plurality of access points belong to a cluster set of a user device. The apparatus may also be caused to allocate a plurality of random-access-channel slots to the plurality of access points such that the plurality of random-access-channel slots are staggered in time over a random-access-channel period within a frame structure used by the user device.

In the apparatus of the second embodiment, the frame structure comprises a 5G mmWave frame structure.

In the apparatus of the second embodiment, the random-access-channel slots are configured for 5G synchronization of both timing and accessibility information.

In the apparatus of the second embodiment, the allocating the plurality of random-access-channel slots to be staggered in time comprises allocating the random-access-channel slots to correspond to different times.

In the apparatus of the second embodiment, the apparatus comprises a random-access-channel slot configurator.

In the apparatus of the second embodiment, the allocating the plurality of random-access-channel slots comprises independently allocating the random-access-channel slots in the cluster set.

In the apparatus of the second embodiment, the allocating the plurality of random-access-channel slots comprises allocating by network-wide planning.

In the apparatus of the second embodiment, the allocating the plurality of random-access-channel slots comprises allocating the random-access-channel slots to be equally spaced in time.

According to a third embodiment, a computer program product may be embodied on a non-transitory computer readable medium, the computer program product configured to control a processor to perform the method of the first embodiment.

According to a fourth embodiment, a method may include receiving, by a user device, information relating to a cluster set of access points. The method may also include receiving system information relating to the access points of the cluster set. The system information may indicate time instants of random-access-channel slots for each of the access points of the cluster set. The method may also include transmitting an uplink request via an earliest random-access-channel slot after arrival of data in an uplink queue of the user device.

In the method of the fourth embodiment, the receiving the system information comprises receiving system information that indicates time instants of random-access-channel slots within a 5G mmWave frame structure used by the user device.

In the method of the fourth embodiment, the receiving the information relating to the cluster set comprises receiving from a cluster-set manager.

In the method of the fourth embodiment, the method may further include configuring the transmitting the uplink request to use the best beam for the access point whose random-access-channel slot is being used.

According to a fifth embodiment, an apparatus may include at least one processor. The apparatus may also include at least one memory including computer program code. The at least one memory and the computer program code may be configured, with the at least one processor, to cause the apparatus at least to receive information relating to a cluster set of access points. The apparatus may also be caused to receive system information relating to the access points of the cluster set, wherein the system information indicates time instants of random-access-channel slots for each of the access points of the cluster set. The apparatus may also be caused to transmit an uplink request via an earliest random-access-channel slot after arrival of data in an uplink queue of the user device.

In the apparatus of the fifth embodiment, the receiving the system information comprises receiving system information that indicates time instants of random-access-channel slots within a 5G mmWave frame structure used by the user device.

In the apparatus of the fifth embodiment, the receiving the information relating to the cluster set comprises receiving from a cluster-set manager.

In the apparatus of the fifth embodiment, the apparatus may be further caused to configure the transmitting the uplink request to use the best beam for the access point whose random-access-channel slot is being used.

According to a sixth embodiment, a computer program product may be embodied on a non-transitory computer readable medium. The computer program product may be configured to control a processor to perform the method of the fourth embodiment According to a seventh embodiment, a method may include receiving, by a user device, information relating to a cluster set of access points. The method may also include acquiring, by a user device, system information relating to access points that are accessible to the user device. The system information indicates time instants of random-access-channel slots for each of the access points. The method may also include transmitting an uplink request via a next random-access-channel slot that appears earliest in time.

According to an eighth embodiment, an apparatus may include at least one processor. The apparatus may also include at least one memory including computer program code. The at least one memory and the computer program code may be configured, with the at least one processor, to cause the apparatus at least to receive information relating to a cluster set of access points. The apparatus may also be caused to acquire system information relating to access points that are accessible to the apparatus. The system information indicates time instants of random-access-channel slots for each of the access points. The apparatus may also be caused to transmit an uplink request via a next random-access-channel slot that appears earliest in time.

BRIEF DESCRIPTION OF THE DRAWINGS

For proper understanding of the invention, reference should be made to the accompanying drawings, wherein:

FIG. 5 illustrates a table of RACH usage based on arrival times of data in accordance with certain embodiments of the present invention.

DETAILED DESCRIPTION

Figure 1:
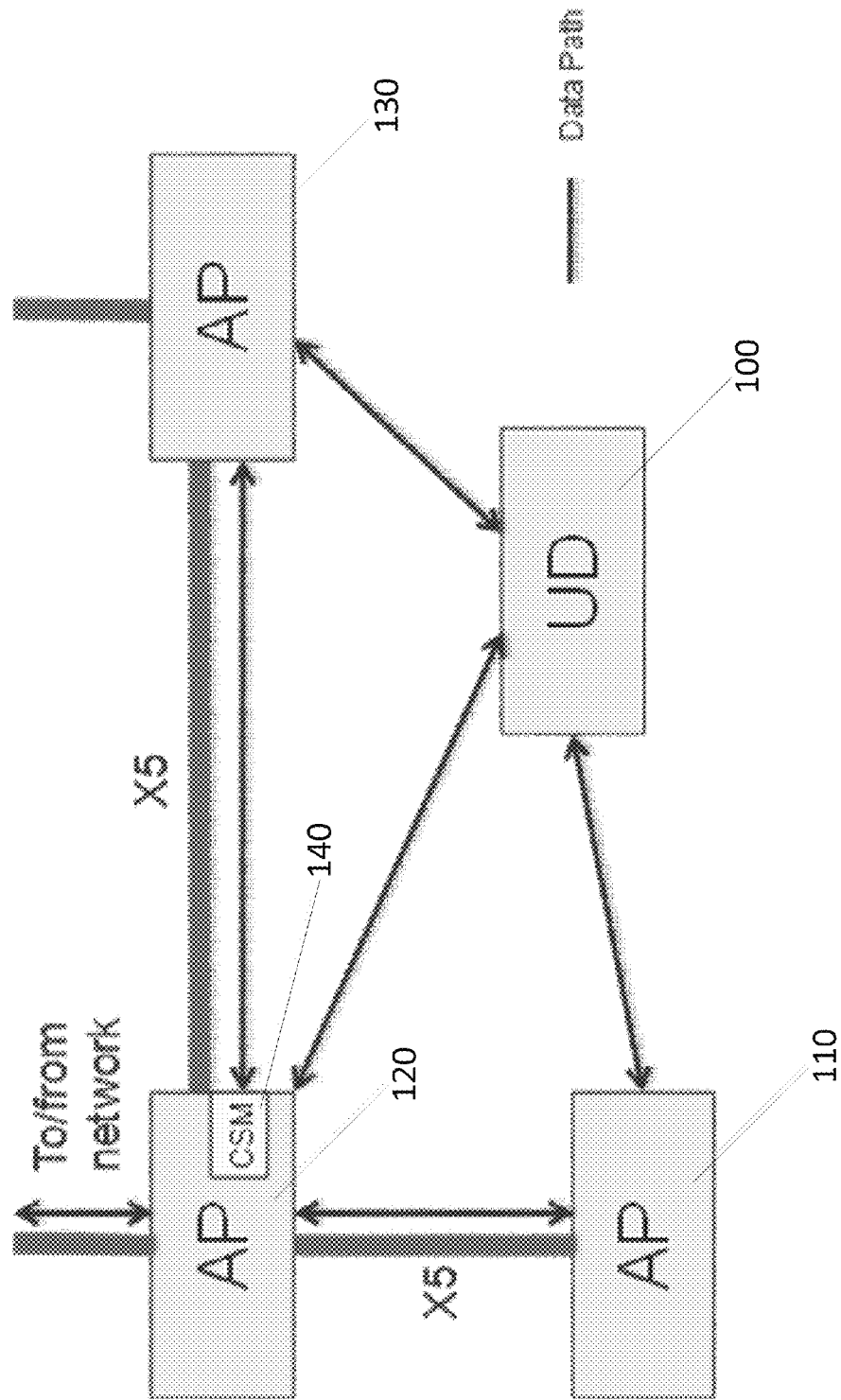
FIG. 1 illustrates a cluster set of a user device (and a cluster set manager of the user device) in accordance with certain embodiments of the present invention.

Embodiments of the present invention relate to implementing efficient low-latency uplink access. For example, certain embodiments of the present invention may be directed to implementing efficient low-latency uplink access for networks, such as 5th Generation wireless networks. 5th Generation (5G) wireless networks are being designed to deliver peak data rates on the order of approximately 10 Gbps, and the target latency requirements have been set to the order of approximately 1 msec. The target latency requirements have been set to such a duration in order to be able to serve applications that have ultra-low latency performance requirements.

Millimeter wave (mmWave) frequency bands have been identified as the bands to be used in conjunction with 5th generation (5G) cellular technology. Spectrum in traditional cellular bands, below 6 GHz, is finite. As cellular data traffic continues to grow, new frequency bands may need to be considered for use. Unlike traditional cellular bands, mmWave bands may allow large blocks of contiguous spectrum to be allocated, allowing for bandwidths on the order of GHz or more. Moreover, the mmWave bands may allow multi-element antenna arrays to be used. Multi-element antenna arrays may comprise very small elements, with sizes on the scale of integrated-circuit (IC) chip elements. Use of these multi-element antenna arrays may provide large antenna gain and sufficient power output through over-the-air power combining. This combination of large bandwidths and device architectures may allow mmWave cellular technologies to provide peak rates on the order of 10 Gbps and to provide ample capacity to meet the future demands.

However, the propagation characteristics within the mmWave band may make implementing communication via the mmWave band more challenging than implementing communication via traditional cellular bands. Diffraction within mmWave bands is effectively non-existent, and propagation within mmWave bands behaves similar to the propagation of visible light. Transmission (within mmWave bands) through most objects generally results in diminished transmission, where foliage and other common obstacles can cause severe shadowing. Reflective power (within mmWave bands), on the other hand, is improved as compared to the reflective power within traditional cellular bands. The improvement of reflective power (within mmWave bands) may offer new opportunities for completing the (communication) link, but the link may be 15 dB-40 dB weaker.

In a typical urban deployment, mmWave access points (AP) may be installed on top of street-side poles, possibly at street corners. Other deployment scenarios may include deployment in stadiums, college campus courtyards, and/or tourist hotspots.

As a result of the shadowing loss characteristics within the mmWave band, the radio link between a user device (UD), and its serving AP, will likely be disrupted if the line-of-sight (LOS) between the UD and the AP is blocked by obstacles. When a pedestrian (with a UD) walks along a sidewalk of a city block, the pedestrian's LOS may be blocked by fixed obstacles (such as trees), or may be blocked by moving obstacles (such as large trucks), or may be blocked by other pedestrians. In a campus courtyard or at a tourist hotspot, LOS blocking may be caused by crowds. Other types of LOS blocking may be caused by user motions, such as by hand or body rotations.

In order to deliver reliable connectivity to a UD in the presence of obstacles, a mmWave access point network may be built with redundant APs. There may be sufficient redundancy of APs such that, in the event of LOS blocking, the network connection to the UD can be rapidly rerouted from one AP to another AP. In such a network, a cluster of access points coordinate to provide uninterrupted connectivity to the UD, where such coordination allows the UD to overcome radio-link blockages resulting from obstacles.

For the above-described network architecture, it may be desirable to provide a method to manage the connectivity between the UD and the overall cluster of APs. Embodiments of the present invention may configure the cluster of APs for the UD.

FIG. 1 illustrates a cluster set of a user device (and a cluster set manager of the user device) in accordance with certain embodiments of the present invention. FIG. 1 illustrates a deployment of a mmWave 5G network where the UD 100 is in the coverage area of a cluster of three APs (110, 120, and 130), and hence UD 100 can communicate to the network via each of those three APs.

As described above, each UD in a mmWave network may be served by a cluster of APs. The cluster of APs for a UD may be referred to as the cluster set for the UD. APs may be selected to be members of the cluster set of a UD based on which APs are accessible by the UD. Among the APs in the cluster set of a UD, one particular AP can be selected as the serving AP for the UD. The network may communicate with the UD through the serving AP. The UD may maintain continuous connectivity with each member of its cluster set by maintaining synchronization with the symbol/frame structure, the downlink and uplink control channels, and/or the downlink and uplink data channels. The UD may also maintain beam synchronization by selecting the best beams for downlink (DL) and uplink (UL) communication with the APs in the cluster set. Continuous connectivity generally means that the UD maintains synchronization with the symbol and frame timings of the AP. With continuous connectivity, the UD knows the timing of the downlink and uplink control channels. With continuous connectivity, the UD may also maintain beam synchronization for downlink and uplink communication. The UD and the network may have determined the transmit/receive weights of the best DL and UL beams for communication with the AP.

An AP may be considered to be accessible by a UD if the UD can receive a beacon waveform transmitted from the AP. The beacon waveform may be a broadcast beacon or a swept beam beacon, whose reception has a signal-to-noise ratio (SNR) above a certain threshold. Accessibility information that may be communicated between an AP and a UD may indicate the best transmit and receive beam weights and the corresponding signal strengths.

The cluster set of a UD may be configured and managed by a cluster set manager (CSM) 140. There may be a logical instance of a CSM for each UD. The logical instance of the CSM 140 may be located in the network. The location of the CSM may be close to the APs in the cluster set in order to enable low-latency communication with those APs and the UD. FIG. 1 illustrates a cluster set that includes three APs (110, 120, and 130) and a cluster set manager (CSM) 140 for a user device (UD) 100.

Figure 2:
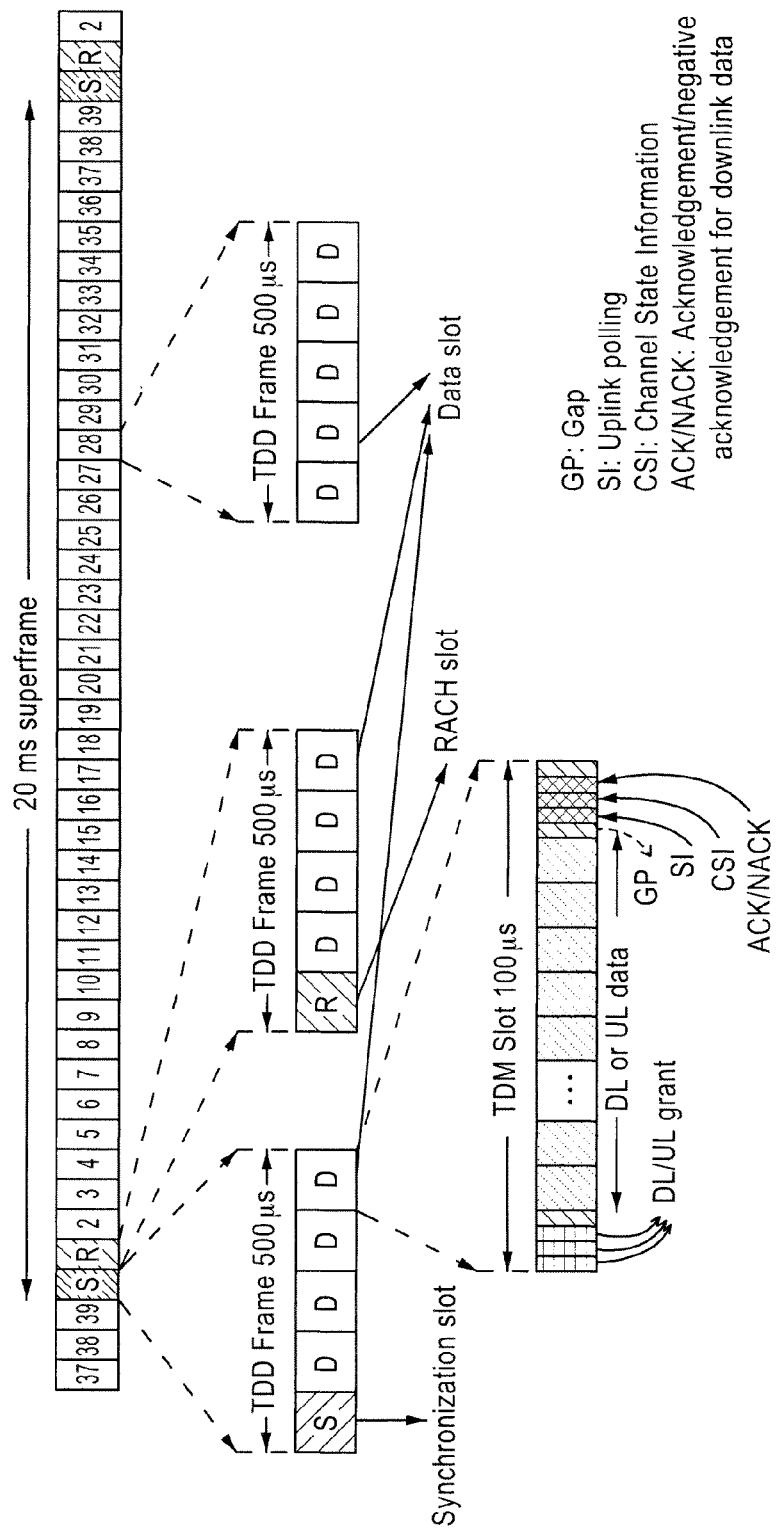
FIG. 2 illustrates a frame structure, such as a millimeter wave 5G frame structure, in accordance with certain embodiments of the present invention.

FIG. 2 illustrates a frame structure, such as a millimeter wave 5G frame structure, in accordance with certain embodiments of the present invention. Although a millimeter wave 5G frame structure is illustrated in FIG. 2, certain embodiments of the present invention may use other types of frame structures. As discussed above, a UD maintains synchronization with the frame structure of the APs in its cluster set. In this embodiment, synchronization may further imply that the UD is not only aware of the individual frame timing of each AP in the cluster set but is also aware of the best accessibility information. The accessibility information between an AP and a UD may comprise the best transmit and receive antenna weights associated with the best beam, the antenna polarization (e.g. horizontal, vertical or circular) and the corresponding signal strengths. The best transmit and receive antenna weights may determine the antenna directivity for a multi-element antenna array. The antenna weights can be implemented using either an analog, digital or hybrid implementation. Other implementations of directional antennas could also be supported by embodiments of the present invention. For example, a di-electric lens antenna can focus mmWave energy through diffraction similar to how an optical lens focuses light. The antenna directivity of a di-electric lens antenna by switching feed elements. With this structure, a 20 msec superframe may be subdivided into 40 subframes. Each subframe may have a duration of 500 microseconds. Each subframe may be further divided into 5 slots. Each slot may have a duration of 100 microseconds. A slot can be used as a synchronization slot (a.k.a. synchronization channel), an uplink random access channel (RACH) slot, or a data slot.

An access point may transmit its synchronization signal over its synchronization slot. The synchronization signal may be used by a UD for performing system acquisition and also for performing a UD-specific beam synchronization to attain the accessibility information for the particular antenna configuration. The synchronization slot may be allocated every 20 msec. The RACH slot may be used by the UD to send an uplink resource request, and the RACH slot can be used by the UD to provide feedback on beam selection. A data slot may contain three segments: a downlink control segment, an uplink control segment, and a data segment. The downlink control segment may be used to communicate the downlink/uplink resource allocations. The uplink control segment can be used for sending automatic repeat request (ARQ) acknowledgement/negative-acknowledgement (ACK/NACK) for downlink data transmissions, channel state information feedback, and/or uplink polling to request uplink resources. The data segment can be used for either downlink or uplink data transmissions as a part of dynamic time-division-duplex (TDD), and the data segment may be determined by the resource allocation in the downlink control channel. User-specific beamforming may be used to communicate over the downlink control segment, uplink control segment, and the data segment.

With regard to configuring the cluster set of a UD, the UD and the network may determine the cluster set for the UD and may determine the UD's serving AP. This determining/configuring may be accomplished in various ways. The UD may determine the accessible APs and their received signal strengths. The UD may select a temporary serving AP based on the signal strength (for example, the selected AP may be the AP with the best signal strength). The UD may communicate its list of accessible APs to the network via the temporary serving AP. The network may determine a cluster set for the UD based on the information received via the temporary serving AP. The network may also select a serving AP. Additionally, the network may instantiate a CSM for the UD. The network may inform the UD, via the temporary serving AP, of the cluster set and of the serving AP.

With respect to receiving the cluster set and with respect to receiving the serving AP, the UD may perform the following. If the serving AP is not the same as the temporary serving AP, the UD may perform a handover to the designated serving AP. For each AP in its cluster set, the UD may acquire the AP's corresponding system information, and the UD may maintain synchronization with frame structure, downlink control channels, and uplink control channels.

As described above, the uplink-access latency may be determined by the RACH periodicity. A trade-off may exist between the amount of system control overhead and the uplink access latency. The maximum latency can correspond to $T_{RACH}$, where $T_{RACH}$ may be the periodicity of RACH. For example, $T_{RACH}$ may correspond to a duration between successive RACH. The average latency may correspond to $T_{RACH}/2$. In the 5G mmWave frame structure illustrated by FIG. 2, the uplink-access latency may be 20 msec, and the corresponding RACH overhead may be 0.5% (i.e., the overhead may be 1 slot out of every 200 slots).

Figure 3:
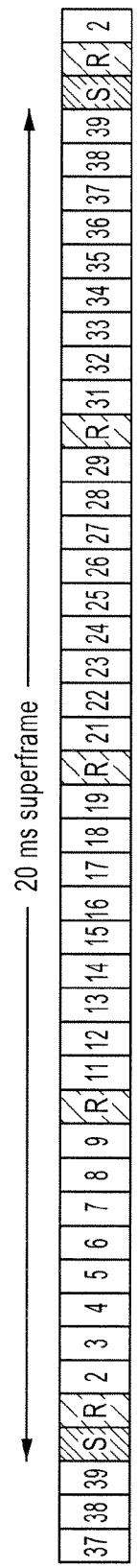
FIG. 3 illustrates reducing uplink-access latency by reducing a random-access-channel periodicity, resulting in a 2% overhead.

FIG. 3 illustrates reducing uplink-access latency by reducing a random-access-channel periodicity, resulting in a 2% overhead. Specifically, FIG. 3 illustrates a 5G mmWave frame structure, where the uplink access latency is reduced to 5 msec (corresponding to a latency reduction of 75%). The latency reduction is achieved by reducing a periodicity of RACH slots (for example, by reducing the duration of time between successive RACH slots). However, by reducing the periodicity of RACH slots, the RACH overhead is increased to 2%.

Although it may be possible to reduce the uplink access latency (by reducing the RACH periodicity) in order to satisfy the desired target requirements for 5G systems, such reduction of RACH periodicity may be impractical due to the resulting high RACH overhead. For example, in order to reduce the uplink access latency (within the above mmWave 5G structure frame) to the target 1 msec duration, the system incurs a corresponding RACH overhead of 10%. This RACH overhead corresponds to 1 slot allocated for RACH for every 2 subframes (where the 2 subframes have a duration of 1 msec). This overhead results in a large degradation in system throughput performance.

In the event that a radio link between the UD and its serving AP is severed/blocked, the UD may possibly not be able to receive any random access response from its serving AP. In the course of performing operations in accordance to the UD's uplink access protocol, the UD may later retry performing the uplink access procedure at the next RACH opportunity (which may occur at intervals of duration $T_{RACH}$). However, all of these repeated uplink access attempts of the UD will generally fail as long as the blockage persists.

In view of the above, certain embodiments of the present invention may be directed to a method for performing uplink access (in a mmWave 5G system, for example) that may reduce the uplink-access latency while also overcoming radio-link blockages. The method may enable fast-uplink access while overcoming radio-link blockages, without resulting in a significant increase of the system control overhead.

With certain embodiments of the present invention, a diversity of access points (within a mmWave 5G network) may be used to reduce an uplink-access latency for a UD, as described in more detail below.

In methods according to certain embodiments of the present invention, the RACH slots for the APs (within a cluster set of a UD) may be allocated in such a way that the RACH slots appear staggered in time to the UD. In one embodiment of the present invention, the staggered RACH slots of the different APs in the cluster set may be equally spaced in time within the RACH period/interval ($T_{RACH}$). With one example embodiment, this allocation may appear as described below.

Suppose a cluster $C_S$ of a UD contains N APs where: $C_S = \{AP_0, AP_1, \ldots, AP_{N-1}\}$ Suppose, $T_{RACH}$=periodicity of RACH in each AP, and $T_s$=the duration of a slot. Then, $N_s$=Number of slots in the RACH period=$T_{RACH}/T_s$. Assume that the successive slots in a RACH period are numbered $0, 1, \ldots, N_s-1$.

Suppose $s_0$ corresponds to the slot number of the RACH slot for $AP_0$. For RACH allocation purposes, successive slots in each RACH period may be numbered 0 to $N_s-1$ (there are $N_s$ slots in the RACH period). Then, the RACH slots for $AP_i$, $i=1, \ldots, N-1$, may be allocated such that, $s_i$=slot number of RACH slot for $AP_i=[s_0+(N_s/N)*i] \mod N_s$, assuming that $N_s$ is an integral multiple of N.

In order to perform an uplink access over RACH, the UD may use the earliest RACH slot (that corresponds to an AP in the UD's cluster set) which occurs next in time. The access point and the RACH slot to be used can be determined as follows.

Suppose t=time instant when data arrives at the uplink queue (within the UD) for uplink transmission. Then, the corresponding slot number can correspond to $$s = \left\lfloor \frac{t}{T_s} \right\rfloor$$

mod $N_S$. The UD may then send the uplink access request to the $AP_k$, $0 \le k < N$, where $$k = \left\lceil \frac{(s+1-s_0) \bmod N_s}{(N_s/N)} \right\rceil$$

in slot s', where $s'=(s_0+k*(N_S/N)) \mod N_S$

Figure 4:
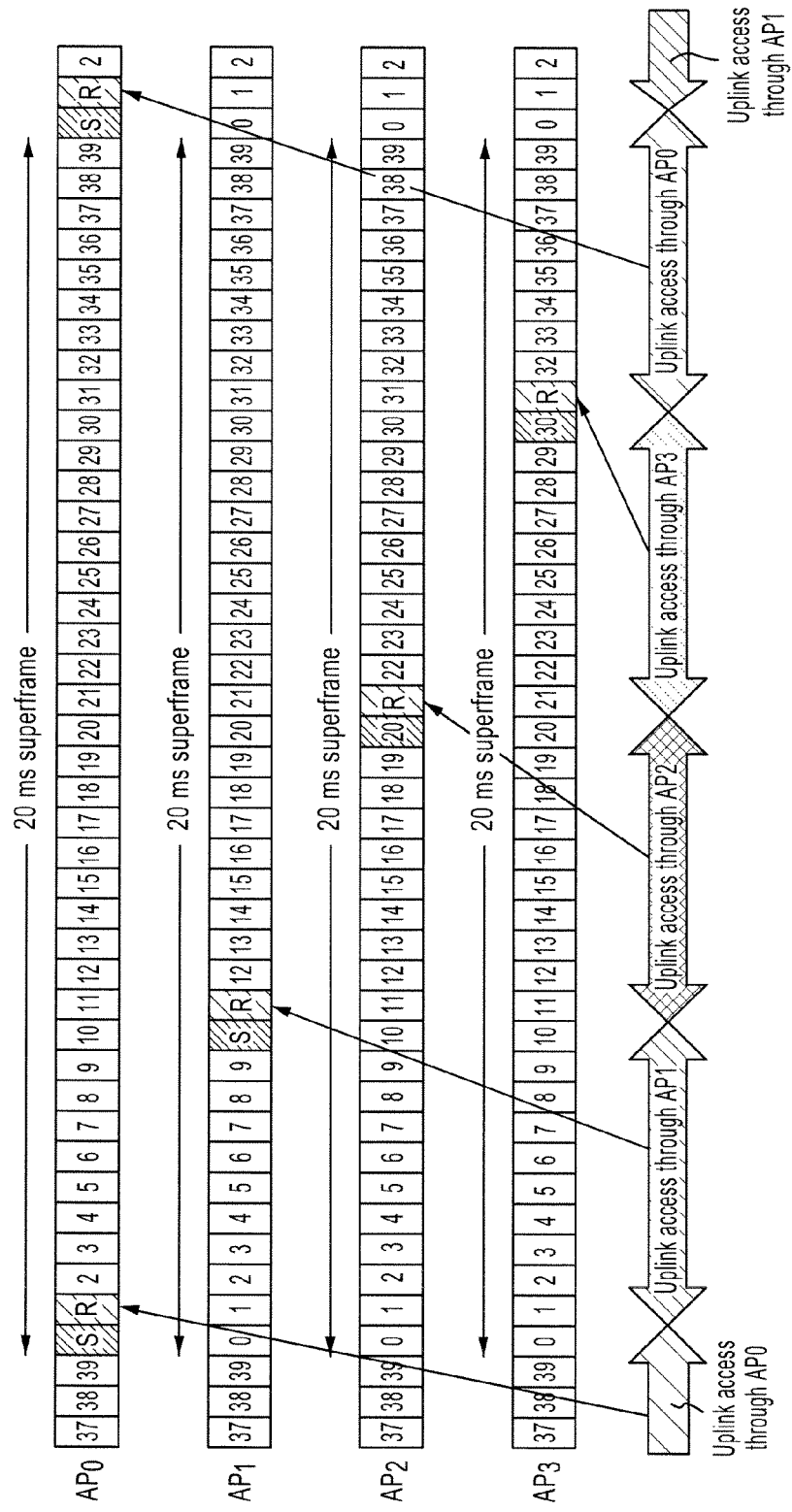
FIG. 4 illustrates a frame structure of multiple access points implementing low-latency and robust uplink access using an access point cluster, in accordance with certain embodiments of the present invention.

FIG. 4 illustrates implementing low-latency and robust uplink access using an access point cluster, in accordance with certain embodiments of the present invention. Specifically, FIG. 4 illustrates the above-described uplink access procedure, for a UD with a cluster set containing four APs.

Referring to FIG. 4, the RACH periodicity may be 20 msec for each of the access points $AP_0$, $AP_1$, $AP_2$ and $AP_3$. The RACH slots for the APs may be allocated in sub-frame (10xi+1) of $AP_i$, i=0, 1, 2, 3 (Without a loss of generality, the first slot of the subframe may be used as the RACH slot).

FIG. 5 illustrates a table of RACH usage based on arrival times of data in accordance with certain embodiments of the present invention. Specifically, the arrival time of data in the uplink queue and the corresponding AP used for uplink access may be described in Table 1 of FIG. 5.

In the event that the radio link between the UD and the AP (to which an uplink access request is to be transmitted by the UD over the RACH slot) is blocked, the UD will use the next earliest available RACH slot to send an uplink access request. A UD may determine that its radio link to an AP is blocked, if it did not receive the synchronization signal from the AP, or it did not receive any reply message from the AP or the network, within a preconfigured time limit, in response to sending an uplink access request to the AP, or any other method. For example, if data arrives in an uplink buffer in the subframe interval 1-10, and if the radio link between the UD and $AP_1$ is blocked, then the UD will use the RACH slot in subframe 21 to send the uplink access request to $AP_2$.

The determining of RACH slot allocation across multiple access points (for implementing the above-described uplink access scheme) can be performed when configuring the cluster set of the UD or when configuring the deployment network.

Figure 6:
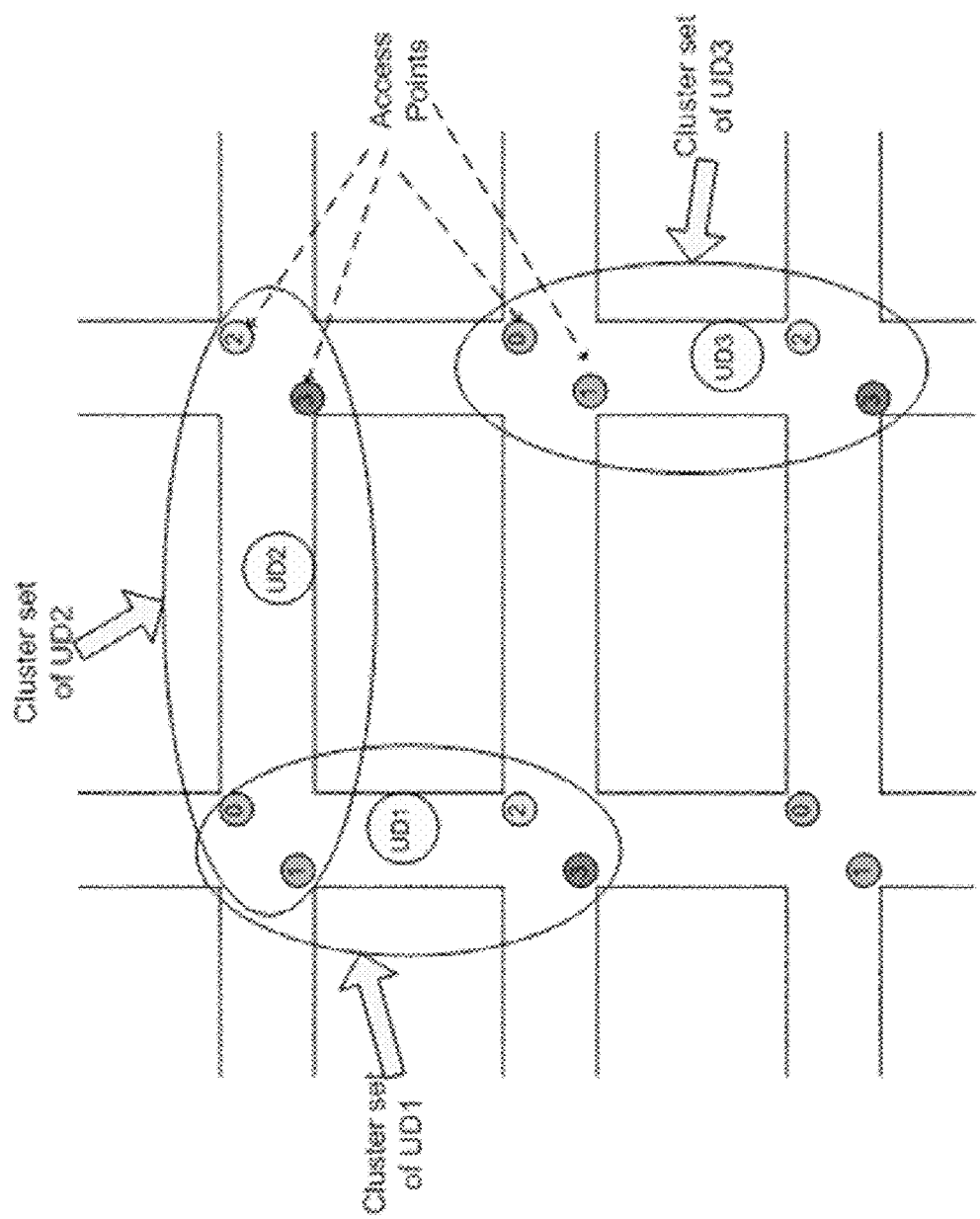
FIG. 6 illustrates utilizing cluster sets in an example urban deployment, in accordance with certain embodiments of the present invention.

FIG. 6 illustrates utilizing cluster sets in an example urban deployment, in accordance with certain embodiments of the present invention. FIG. 6 illustrates the cluster sets for three user devices UD1, UD2 and UD3. At any location, the cluster set of each user device may include four APs. The numbering of the APs may correspond to the RACH slot allocation, as illustrated by FIG. 4.

In view of the above, the steps for implementing certain embodiments of the present invention are described below. With regard to RACH slot configuration, a network entity (such as a RACH slot configurator, for example) may allocate the RACH slots of the access points. The RACH slots may be allocated to the access points (within a cluster set for a UD) such that the RACH slots are staggered in time, as previously described.

With regard to cluster set acquisition, the UD may acquire its cluster set information from the network and may then acquire system information for each of the APs in its cluster set. The system information of a given AP may include the RACH slot location (in time) for the AP.

Figure 7:
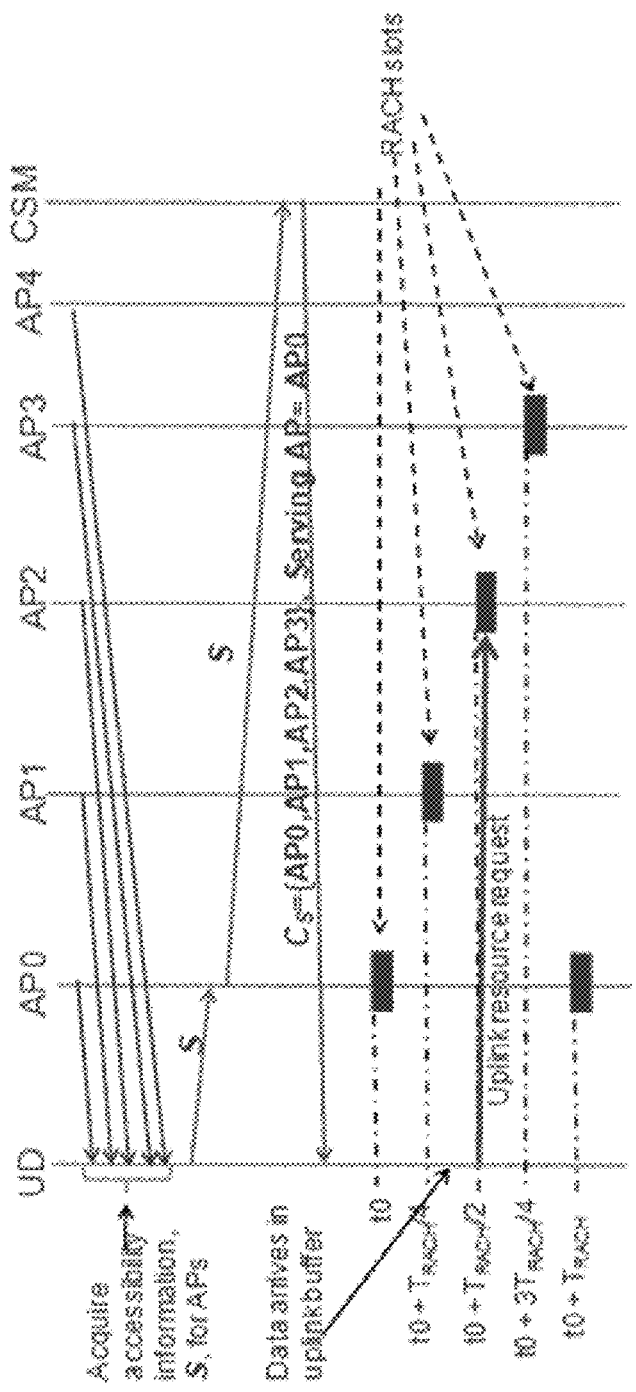
FIG. 7 illustrates using a cluster-set configuration to perform uplink access procedures, in accordance with certain embodiments of the present invention.

FIG. 7 illustrates using a cluster-set configuration to perform uplink access procedures, in accordance with certain embodiments of the present invention. With regard to the uplink access procedure of FIG. 7, when the UD accesses the uplink (after new data arrives in the uplink buffer), the following steps may be performed. With a first step, the UD may determine the AP (in the UD's cluster set) whose RACH slot occurs next earliest in time. This AP may be designated as the UL-AP. With a second step, the UD may select the best beam configuration for communication with the UL-AP, and the UD may transmit the uplink-access request over the selected beam configuration in the RACH slot of the UL-AP. With a third step, if the UD receives a response from the UL-AP indicating a successful random access, the UD will continue with the uplink data transfer procedure. With a fourth step, if the UD does not receive a response from the UL-AP, the UD determines that the random access attempt has failed. The UD may repeat the above-described steps of the uplink-access procedure.

Figure 8:
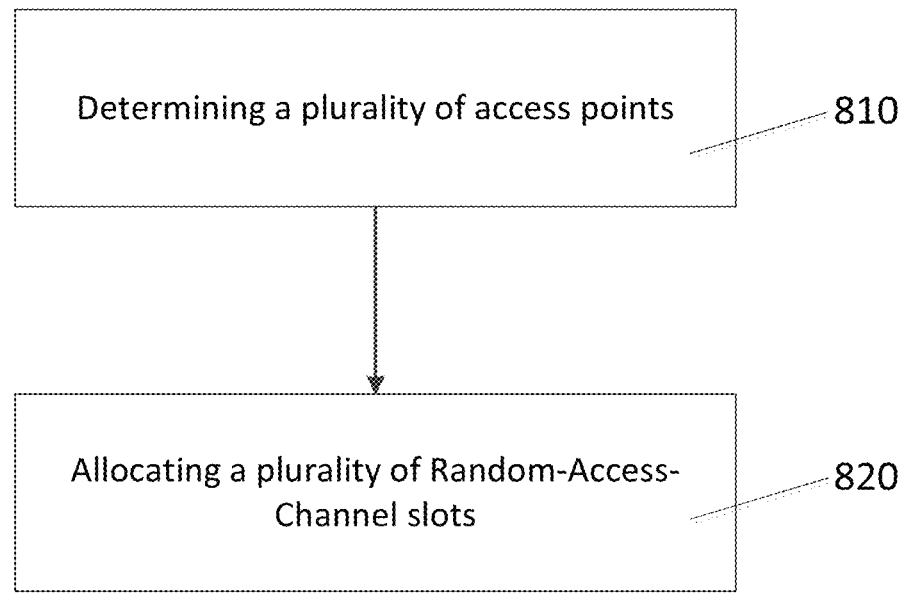
FIG. 8 illustrates a flowchart of a method in accordance with embodiments of the invention.

FIG. 8 illustrates a flowchart of a method in accordance with embodiments of the invention. The method may be performed by a random-access-channel slot configurator. The method illustrated in FIG. 8 includes, at 810, determining, by a network element, a plurality of access points. The plurality of access points belong to a cluster set of a user device. The method may also include, at 820, allocating a plurality of random-access-channel slots to the plurality of access points such that the plurality of random-access-channel slots are staggered in time over a random-access-channel period within a 5G mmWave frame structure used by the user device. In certain embodiments, the plurality of random-access-channel slots may be staggered in time as illustrated by FIG. 4. In another embodiment, the random-access-channel configurator may allocate a plurality of RACH slots to a plurality of APs in the network such that, within the APs in a cluster set of a UD, the RACH slots are staggered in time.

Figure 9:
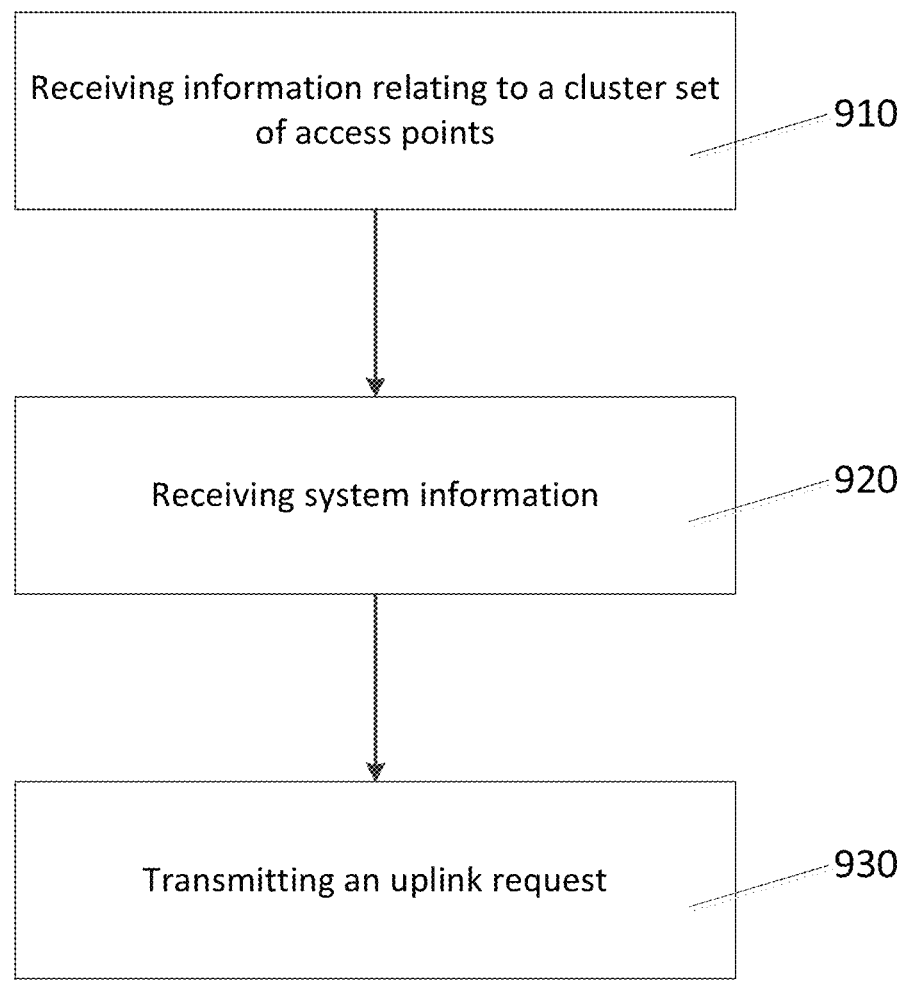
FIG. 9 illustrates a flowchart of a method in accordance with embodiments of the invention.

FIG. 9 illustrates a flowchart of a method in accordance with embodiments of the invention. The method of FIG. 9 may be performed by a user device, for example. The method illustrated in FIG. 9 includes, at 910, receiving information relating to a cluster set of access points. The method may also include, at 920, receiving system information relating to the access points of the cluster set. The system information may indicate time instants of random-access-channel slots for each of the access points of the cluster set. The method may also include, at 930, transmitting an uplink request via an earliest random-access-channel slot after arrival of data in an uplink queue of the user device. In certain embodiments of the present invention, the time instants of random-access-channel slots may be configured in a manner similar to the slots illustrated by FIG. 4.

Figure 10:
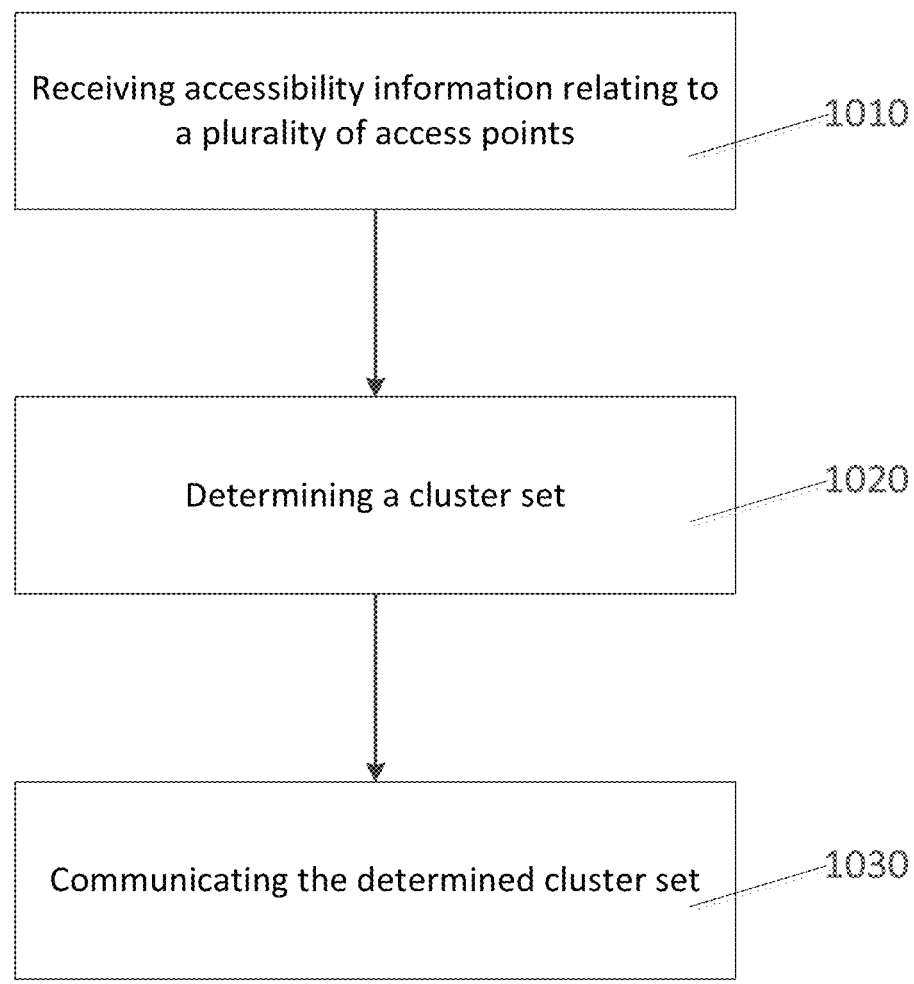
FIG. 10 illustrates a flowchart of a method in accordance with embodiments of the invention.

FIG. 10 illustrates a flowchart of a method in accordance with embodiments of the invention. The method of FIG. 10 may be performed by a cluster-set manager, for example. The method illustrated in FIG. 10 includes, at 1010, receiving accessibility information relating to a plurality of access points from a user device. The method may also include, at 1020, determining a cluster set for the user device based on received accessibility information. The method may also include, at 1030, communicating the determined cluster set to the user device. In certain embodiments, the plurality of access points may be configured in manner similar to the access points illustrated by FIG. 4.

Figure 11:
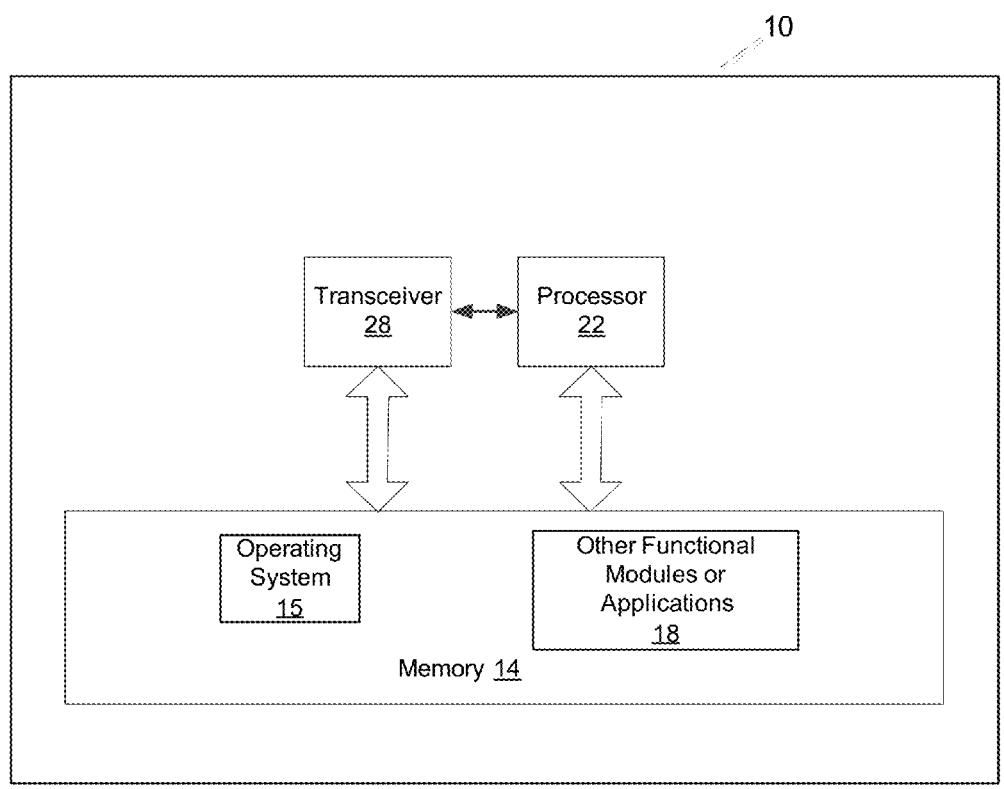
FIG. 11 illustrates an apparatus in accordance with embodiments of the invention.

FIG. 11 illustrates an apparatus in accordance with embodiments of the invention. In one embodiment, the apparatus can be a network element, such as a user device, access point, and/or a random-access-channel slot configurator, for example. Apparatus 10 can include a processor 22 for processing information and executing instructions or operations. Processor 22 can be any type of general or specific purpose processor. While a single processor 22 is shown in FIG. 11, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 12:
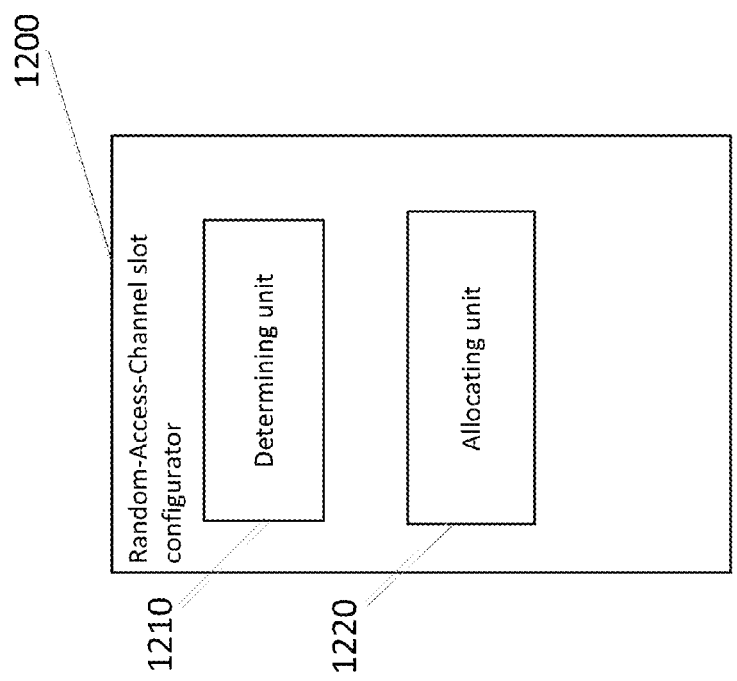
FIG. 12 illustrates an apparatus in accordance with embodiments of the invention.

FIG. 12 illustrates an apparatus in accordance with embodiments of the invention. Apparatus 1200 can be a network element/entity such as a random-access-channel slot configurator, for example. Apparatus 1200 may include a determining unit 1210 that determines a plurality of access points. The plurality of access points belong to a cluster set of a user device. Apparatus 1200 may include an allocating unit 1220 that allocates a plurality of random-access-channel slots to the plurality of access points such that the plurality of random-access-channel slots are staggered in time over a random-access-channel period within a frame structure used by the user device.

Figure 13:
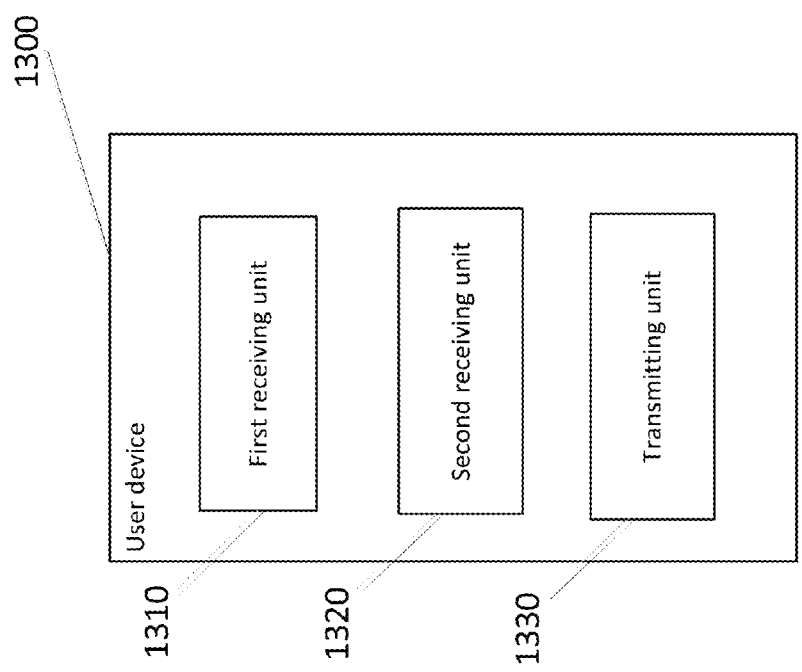
FIG. 13 illustrates an apparatus in accordance with embodiments of the invention.

FIG. 13 illustrates an apparatus in accordance with embodiments of the invention. Apparatus 1300 can be a network element/entity such as a user device, for example. Apparatus 1300 can include a first receiving unit 1310 that receives information relating to a cluster set of access points. Apparatus 1300 may also include a second receiving unit 1320 that receives system information relating to the access points of the cluster set. This information may be time-multiplexed and received by the same hardware, using the same transceiver. The system information indicates time instants of random-access-channel slots for each of the access points of the cluster set. Apparatus 1300 may also include a transmitting unit 1330 that transmits an uplink request via an earliest random-access-channel slot after arrival of data in an uplink queue of the user device.

Figure 14:
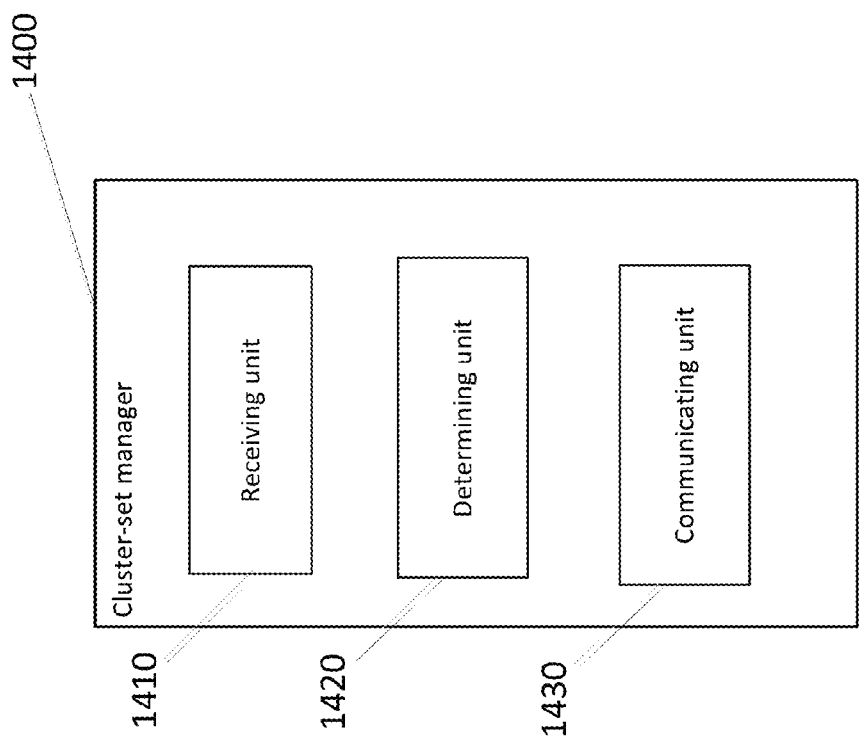
FIG. 14 illustrates an apparatus in accordance with embodiments of the invention.

FIG. 14 illustrates an apparatus in accordance with embodiments of the invention. Apparatus 1400 can be a network element/entity such as a cluster-set manager, for example. Apparatus 1400 can include a receiving unit 1410 that receives accessibility information relating to a plurality of access points from a user device. Apparatus 1400 may also include a determining unit 1420 that determines a cluster set for the user device based on received accessibility information. Apparatus 1400 may also include communicating unit 1430 that communicates the determined cluster set to the user device.

Figure 15:
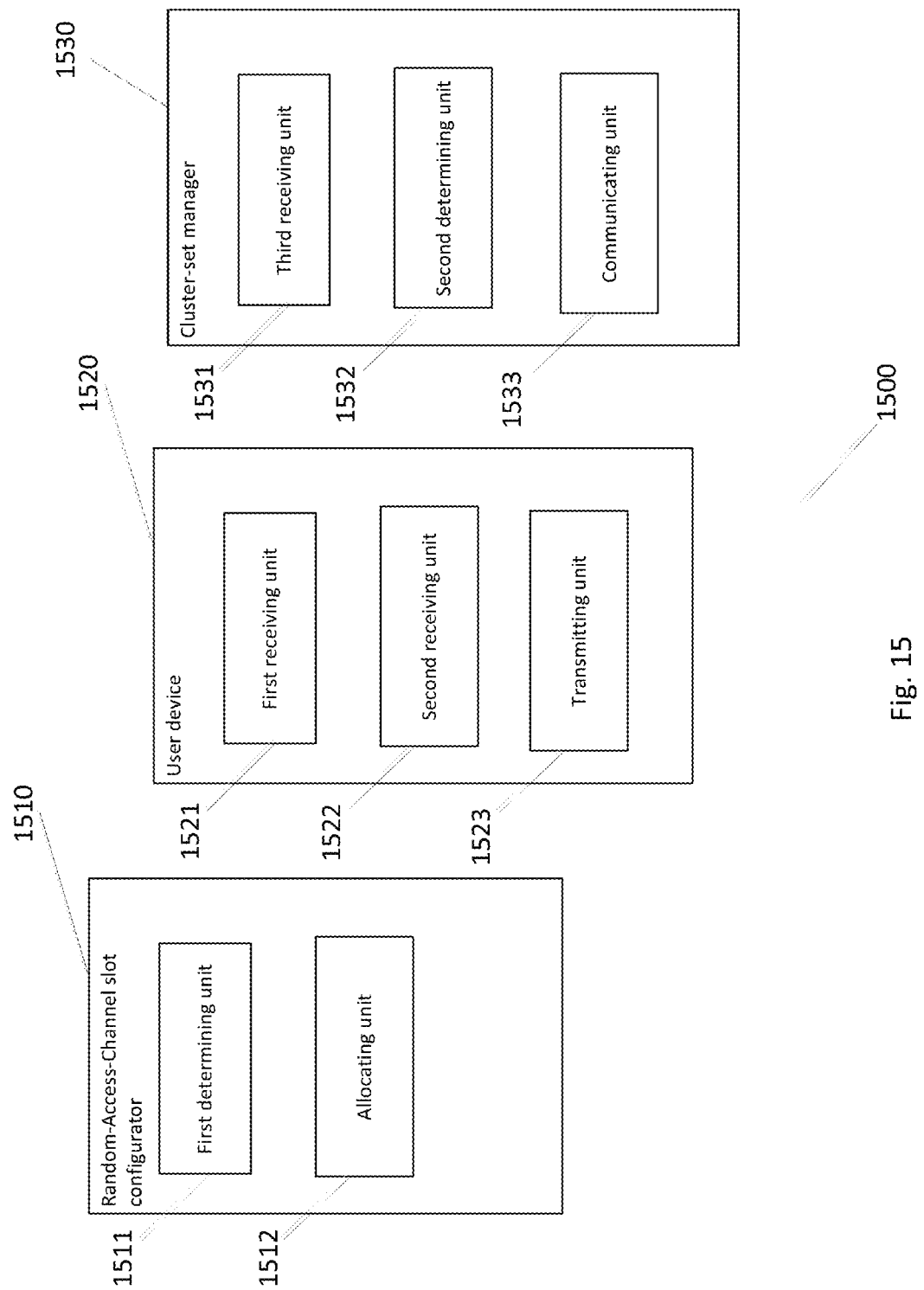
FIG. 15 illustrates a system in accordance with embodiments of the invention.

FIG. 15 illustrates a system in accordance with embodiments of the invention. System 1500 may include a first apparatus 1510. First apparatus 1510 can be a network element/entity such as a random-access-channel slot configurator, for example. First apparatus 1510 may include a first determining unit 1511 that determines a plurality of access points. The plurality of access points belong to a cluster set of a user device. First apparatus 1510 may include an allocating unit 1512 that allocates a plurality of random-access-channel slots to the plurality of access points such that the plurality of random-access-channel slots are staggered in time over a random-access-channel period within a frame structure used by the user device.

System 1500 may also include a second apparatus 1520. Second apparatus 1520 can be a network element/entity such as a user device, for example. Second apparatus 1520 can include a first receiving unit 1521 that receives information relating to a cluster set of access points. Second apparatus 1520 may also include a second receiving unit 1522 that receives system information relating to the access points of the cluster set. The system information indicates time instants of random-access-channel slots for each of the access points of the cluster set. Second apparatus 1520 may also include a transmitting unit 1523 that transmits an uplink request via an earliest random-access-channel slot after arrival of data in an uplink queue of the user device.

System 1500 may also include a third apparatus 1530. Third apparatus 1530 can be a network element/entity such as a cluster-set manager, for example. Third apparatus 1530 can include a third receiving unit 1531 that receives accessibility information relating to a plurality of access points from a user device. Third apparatus 1530 may also include a second determining unit 1532 that determines a cluster set for the user device based on received accessibility information. Third apparatus 1530 may also include communicating unit 1533 that communicates the determined cluster set to the user device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining, by a network element, a plurality of access points, wherein the plurality of access points belong to a cluster set of a user device; and
   allocating a plurality of random-access-channel slots to the plurality of access points such that the plurality of random-access-channel slots are staggered in time over a random-access-channel period within a frame structure used by the user device, wherein a position of the plurality of random-access-channel slots within a subframe of the random-access-channel period is determined according to an integer corresponding to a number of access points of the plurality of access points in the cluster set multiplied by ten, and adding a value of one to a product of the multiplication.

2. The method according to claim 1, wherein the frame structure comprises a 5G mmWave frame structure.

3. The method according to claim 1, wherein the plurality of random-access-channel slots are configured for 5G synchronization of both timing and accessibility information.

4. The method according to claim 1, wherein the allocating of the plurality of random-access-channel slots to be staggered in time comprises allocating the plurality of random-access-channel slots to correspond to different times.

5. The method according to claim 1, wherein the determining comprises determining by a random-access-channel slot configurator.

6. The method according to claim 1, wherein the allocating the plurality of random-access-channel slots comprises independently allocating the random-access-channel slots in the cluster set.

7. The method according to claim 1, wherein the allocating the plurality of random-access-channel slots comprises allocating by network-wide planning.

8. The method according to claim 1, wherein the allocating the plurality of random-access-channel slots comprises allocating the plurality of random-access-channel slots to be equally spaced in time.

9. An apparatus, comprising:
at least one processor; and
at least one memory including computer program code,
the at least one memory and the computer program code configured, with the at least one processor, to cause the apparatus at least to
determine a plurality of access points, wherein the plurality of access points belong to a cluster set of a user device; and
allocate a plurality of random-access-channel slots to the plurality of access points such that the plurality of random-access-channel slots are staggered in time over a random-access-channel period within a frame structure used by the user device, wherein a position of the plurality of random-access-channel slots within a sub-frame of the random-access-channel period is determined according to an integer corresponding to a number of access points of the plurality of access points in the cluster set multiplied by ten, and adding a value of one to a product of the multiplication.

10. The apparatus according to claim 9, wherein the frame structure comprises a 5G mmWave frame structure.

11. The apparatus according to claim 9, wherein the plurality of random-access-channel slots are configured for 5G synchronization of both timing and accessibility information.

12. The apparatus according to claim 9, wherein the allocating of the plurality of random-access-channel slots to be staggered in time comprises allocating the plurality of random-access-channel slots to correspond to different times.

13. The apparatus according to claim 9, wherein the apparatus comprises a random-access-channel slot configurator.

14. The apparatus according to claim 9, wherein the allocating of the plurality of random-access-channel slots comprises independently allocating the plurality of random-access-channel slots in the cluster set.

15. The apparatus according to claim 9, wherein the allocating of the plurality of random-access-channel slots comprises allocating by network-wide planning.

16. The apparatus according to claim 9, wherein the allocating of the plurality of random-access-channel slots comprises allocating the plurality of random-access-channel slots to be equally spaced in time.

17. A computer program product, embodied on a non-transitory computer readable medium, the computer program product configured to control a processor to perform the method of claim 1.

18. A method, comprising:
receiving, by a user device, first information relating to a cluster set of access points;
receiving, by the user device, system information relating to the access points of the cluster set, wherein the system information indicates time instants of a plurality of random-access-channel slots for each of the access points of the cluster set; and
transmitting, by the user device, an uplink request via one of the access points of the cluster set whose random-access-channel slot occurs after arrival of data in an uplink queue of the user device, wherein a position of the plurality of random-access-channel slots within a sub-frame of the random-access-channel period is determined according to an integer corresponding to a number of access points of the plurality of access points in the cluster set multiplied by ten, and adding a value of one to a product of the multiplication.

19. The method of claim 18, wherein the receiving the system information comprises receiving system information that indicates time instants of the plurality of random-access-channel slots within a 5G mmWave frame structure used by the user device.

20. The method of claim 18, wherein the receiving the system information relating to the cluster set comprises receiving from a cluster-set manager.

21. The method of claim 18, further comprising configuring the transmitting the uplink request to use a best beam for the access point whose random-access-channel slot is being used.

22. An apparatus, comprising:
at least one processor; and
at least one memory including computer program code,
the at least one memory and the computer program code configured, with the at least one processor, to cause the apparatus at least to
receive first information relating to a cluster set of a plurality of access points;
receive system information relating to the plurality of access points of the cluster set, wherein the system information indicates time instants of a plurality of random-access-channel slots for each of the plurality of access points of the cluster set; and
transmit an uplink request via one of the plurality of access points of the cluster set whose random-access-channel slot occurs after arrival of data in an uplink queue, wherein a position of the plurality of random-access-channel slots within a sub-frame of the random-access-channel period is determined according to an integer corresponding to a number of access points of the plurality of access points in the cluster set multiplied by ten, and adding a value of one to a product of the multiplication.

23. The apparatus of claim 22, wherein the receiving the system information comprises receiving system information that indicates time instants of the plurality of random-access-channel slots within a 5G mmWave frame structure used by the user device.

24. The apparatus of claim 22, wherein the receiving the system information relating to the cluster set comprises receiving from a cluster-set manager.

25. The apparatus of claim 22, wherein the apparatus is further caused to configure the transmitting the uplink request to use a best beam for the access point whose random-access-channel slot is being used.

26. A computer program product, embodied on a non-transitory computer readable medium, the computer program product configured to control a processor to perform the method of claim 18.

27. A method, comprising:
acquiring system information relating to a plurality of access points that are accessible to a user device, wherein the system information indicates time instants of a plurality of random-access-channel slots for each of the plurality of access points; and
transmitting, by the user device, an uplink request via one of the plurality of access points of the cluster set whose random-access-channel slot occurs; after arrival of data in an uplink queue of the user device, wherein a position of the plurality of random-access-channel slots within a sub-frame of the random-access-channel period is determined according to an integer corresponding to a number of access points of the plurality of access points in the cluster set multiplied by ten, and adding a value of one to a product of the multiplication.

28. An apparatus, comprising:
at least one processor; and
at least one memory including computer program code,
the at least one memory and the computer program code configured, with the at least one processor, to cause the apparatus at least to
acquire system information relating to a plurality of access points that are accessible to the apparatus, wherein the system information indicates time instants of a plurality of random-access-channel slots for each of the plurality of access points; and
transmit an uplink request via one of the plurality of access points of the cluster set whose random-access-channel slot occurs after arrival of data in an uplink queue of a user device, wherein a position of the plurality of random-access-channel slots within a sub-frame of the random-access-channel period is determined according to an integer corresponding to a number of access points of the plurality of access points in the cluster set multiplied by ten, and adding a value of one to a product of the multiplication.

* * * * *